United States Patent
Han et al.

(10) Patent No.: US 11,784,685 B2
(45) Date of Patent: Oct. 10, 2023

(54) DEEP CONVOLUTIONAL NEURAL NETWORK POWERED TERAHERTZ ULTRA-MASSIVE MULTI-INPUT-MULTI-OUTPUT CHANNEL ESTIMATION METHOD

(71) Applicant: SHANGHAI JIAOTONG UNIVERSITY, Shanghai (CN)

(72) Inventors: Chong Han, Shanghai (CN); Yuhang Chen, Shanghai (CN); Longfei Yan, Shanghai (CN)

(73) Assignee: SHANGHAI JIAOTONG UNIVERSITY, Shanghai (CN)

( * ) Notice: Subject to any disclaimer, the term of this patent is extended or adjusted under 35 U.S.C. 154(b) by 0 days.

(21) Appl. No.: 17/807,306

(22) Filed: Jun. 16, 2022

(65) Prior Publication Data
US 2022/0416851 A1 Dec. 29, 2022

(30) Foreign Application Priority Data
Jun. 28, 2021 (CN) .......................... 202110715991.1

(51) Int. Cl.
*H04B 7/0452* (2017.01)
*H04B 7/0426* (2017.01)
*H04L 25/02* (2006.01)

(52) U.S. Cl.
CPC .......... *H04B 7/0452* (2013.01); *H04B 7/043* (2013.01); *H04L 25/0254* (2013.01)

(58) Field of Classification Search
CPC ...... H04B 7/0452; H04B 7/043; H04B 10/90; H04B 7/0456; H04B 7/0617; H04L 25/0254
See application file for complete search history.

(56) References Cited

U.S. PATENT DOCUMENTS 10,998,945 B1 * 5/2021 Baligh .................. H04B 7/086

* cited by examiner

Primary Examiner — Vineeta S Panwalkar
(74) *Attorney, Agent, or Firm* — CBM PATENT CONSULTING, LLC

(57) ABSTRACT

A THz UM-MIMO channel estimation method based on the DCNN comprises the steps: the hybrid spherical and planar-wave modeling (HSPM), by taking a sub-array in the antenna array as a unit, employing the PWM within the sub-array, and employing the SWM among the sub-arrays; estimating the channel parameters between the reference sub-arrays at Tx and Rx through a DCNN, including the angles of departure and arrival, the propagation distance and the path gain; deducing the channel parameters between the reference sub-array and other sub-arrays by utilizing the obtained channel parameters and the geometrical relationships among sub-arrays, and recovering the channel matrix; wherein accurate three-dimensional channel modeling is achieved by the HSPM, which possesses high modeling accuracy and low complexity.

6 Claims, 6 Drawing Sheets

DEEP CONVOLUTIONAL NEURAL NETWORK POWERED TERAHERTZ ULTRA-MASSIVE MULTI-INPUT-MULTI-OUTPUT CHANNEL ESTIMATION METHOD

CROSS REFERENCES

This application claims priority to Chinese Patent Application Ser. No. CN202110715991.1 filed on 28 Jun. 2021.

TECHNICAL FIELD

The invention relates to the technical field of Terahertz (THz) communications, in particular to the Terahertz ultra-massive multi-input-output (THz UM-MIMO) channel modeling and estimation methods based on the DCNN.

BACKGROUND OF THE INVENTION

The accurate three-dimensional channel model is the basis for studying the ultra-massive multi-input-output (UM-MIMO) system, efficiently and accurately estimating the Terahertz (THz) channel information is the premise of realizing the potential of THz systems. However, existing multi-input-output (MIMO) system research generally employs a planar-wave channel model (PWM). This model is a simplification of the ground-truth spherical-wave channel model (SWM) by approximating signal propagation as a plane. The modeling error can be neglected when the array scale and carrier frequency are small. However, with the increment of the dimension of the antenna array and the carrier frequency, the accuracy of the planar-wave model is greatly reduced. Therefore, it is necessary to consider the most accurate SWM. However, the complexity of the SWM is positively related to the number of antennas. As the number of antennas in the THz UM-MIMO system increases, the complexity of the SWM increases correspondingly.

Existing channel estimation (CE) methods of the MIMO systems usually adopt a PWM, which is a simplification of the SWM. In the THz UM-MIMO systems, due to the increment of the dimension of the antenna array and the carrier frequency, the accuracy of the PWM is greatly reduced, and the spherical-wave should be considered. However, with the change of the channel model, existing CE algorithms lose their effectiveness.

SUMMARY OF THE INVENTION

Aiming at the problem that the channel model of the existing THz UM-MIMO system is inaccurate and the CE method is to be studied, the invention provides a THz UM-MIMO CE method based on a deep convolutional neural network (DCNN). The method exploits a hybrid spherical and planar-wave modeling (HSPM) for accurate three-dimensional channel modeling, which realizes high modeling accuracy and low complexity, and proposes a matched CE method according to the established HSPM, to effectively obtain the channel information and achieve optimal resource allocation, and fully exert the potential of the THz communication systems.

The present invention is implemented by the following technical solutions:

The invention relates to a THz UM-MIMO CE method based on a HSPM, comprising the following steps:

Step 1: the HSPM channel modeling, within a sub-array, the PWM is adopted, and the SWM is adopted among the sub-arrays.

Step 2: estimating the angles of departure and arrival, the propagation distance and the path gain between the reference sub-arrays in the step 1 by the DCNN.

Step 3: The channel parameters between the reference sub-array and the remaining sub-arrays are deduced by using the channel parameters obtained in step 2 and the geometric relationships among the sub-arrays, and the channel matrix is recovered.

Technical Effect

The present invention solves the problem in the prior art that the PWM of the UM-MIMO system is not accurate enough, the complexity of the SWM is too high, and the CE algorithm matched with the UM-MIMO system is not effective enough.

Compared with the prior art, the HSPM is adopted, the PWM is adopted in the sub-array, a SWM is adopted among different sub-arrays, and the high precision and low complexity channel modeling is realized. At the same time, through the two-stage CE mechanism, the channel parameter estimation of the reference sub-array is completed by designing the DCNN, and then the residual parameter estimation is completed by using the geometric relationship of the channel parameters between the reference sub-arrays, and the channel matrix is recovered. Since only a DCNN needs to be used for parameter estimation of the reference sub-array, the required number of channel parameters to be estimated is the same as that by using the PWM. Since the parameter estimation at the second stage can be performed in parallel, the proposed method achieves low complexity and high effectiveness of CE compared to conventional CE algorithms

DETAILED DESCRIPTION OF THE INVENTION

Figure 1:
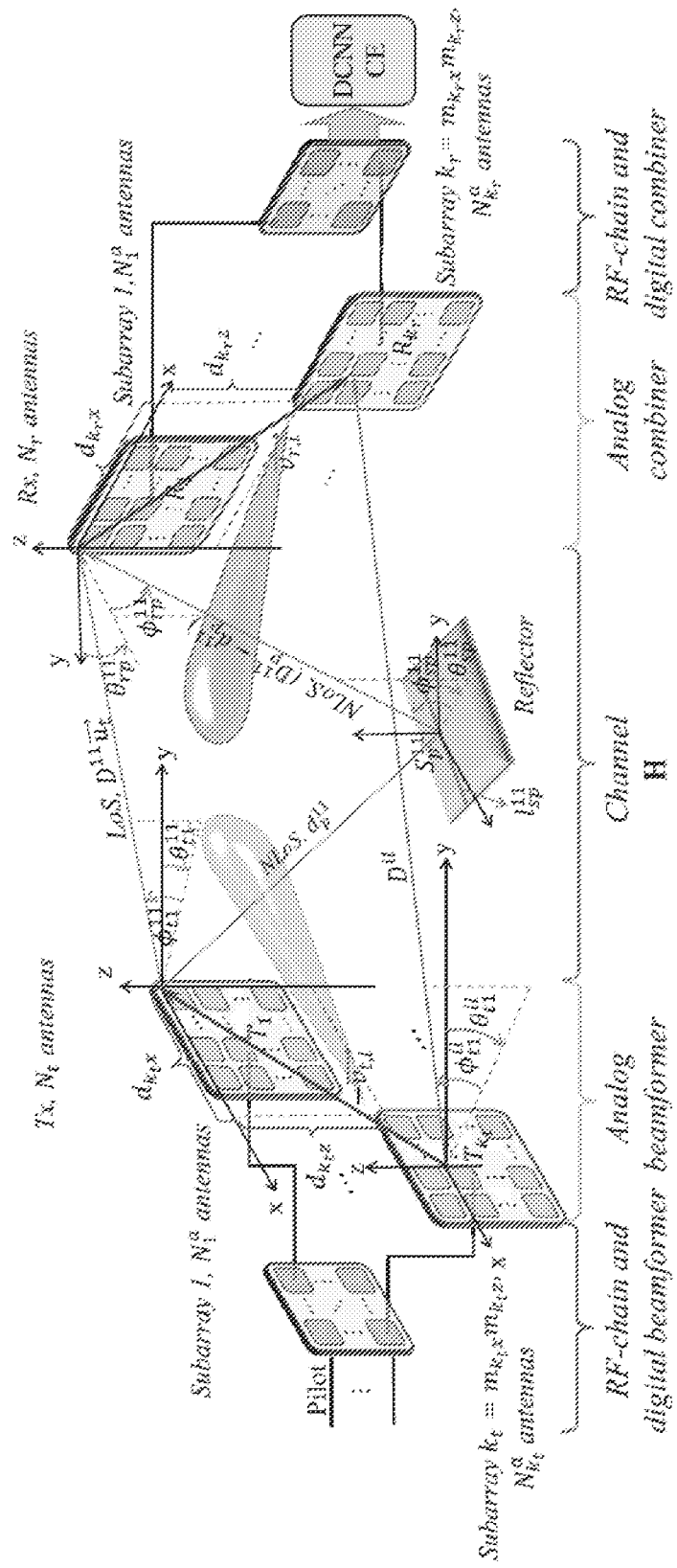
FIG. 1 is a schematic diagram of a system according to the present invention.

As shown in FIG. 1, a THz UM-MIMO CE system based on a DCNN according to an embodiment includes: radio frequency (RF)-chains, an analog beamformer, an analog combiner, and a digital combiner. The RF-chain at the transmitter (Tx) transmits the baseband pilot signal and perform digital beamforming, to obtain the RF signal. The analog beamformer performs analog beamforming according to a predefined beam codebook, and transmits the analog signal to the channel. The analog combiner at the receiver (Rx) combines the received signals and outputs it to the digital combiner. The digital combiner performs signal processing on the combined analog signal to obtain a baseband signal. Finally, the baseband processes the digital signal to complete the CE.

The present embodiment relates to a THz UM-MIMO CE method based on a DCNN is composed of the following steps:

Step 1, as shown in FIG. 1, take a sub-array as a unit, the PWM is adopted in the sub-array, and the SWM is used between the sub-arrays to complete the HSPM, specifically it is composed of:

1) dividing the antennas at Tx and Rx into $K_t$ and $K_r$ sub-arrays, respectively, and different sub-arrays have the same number of multi-path $N_p$. The channel gains between different sub-arrays have the same amplitude, while the phase of the channel gain is changed due to different geometric distances and transceiver angles. The HSPM can be expressed as $$H_{HSPM} = \sum_{p=1}^{N_p} \begin{bmatrix} |\alpha_p^{11}|e^{-j\frac{2\pi}{\lambda}D_p^{11}}a_{rp}^{11}(a_{tp}^{11})^H & \cdots & |\alpha_p^{11}|e^{-j\frac{2\pi}{\lambda}D_p^{1K_t}}a_{rp}^{1K_t}(a_{tp}^{1K_t})^H \\ \cdots & & \cdots \\ |\alpha_p^{11}|e^{-j\frac{2\pi}{\lambda}D_p^{K_r1}}a_{rp}^{K_r1}(a_{tp}^{K_r1})^H & \cdots & |\alpha_p^{11}|e^{-j\frac{2\pi}{\lambda}D_p^{K_rK_t}}a_{rp}^{K_rK_t}(a_{tp}^{K_rK_t})^H \end{bmatrix},$$

where $N_p$ is the number of multi-paths in the channel, $\alpha_p^{11}$ is the channel gain of the $p^{th}$ path, $\lambda$ is the signal wavelength, $D_p^{k_r,k_t}$ is the transmission distance of the $p^{th}$ path, $a_{rp}^{k_r,k_t}$ and $a_{tp}^{k_r,k_t}$ the array steering vectors at Tx and Rx, respectively, whose value are determined by the propagation angles.

The block structure of the HSPM $H_{HSPM}$ refers to: each block $$|\alpha_p^{11}|e^{-j\frac{2\pi}{\lambda}D_p^{k_r k_t}}a_{rp}^{k_r k_t}(a_{tp}^{k_r k_t})^H$$

is a PWM matrix between the sub-arrays at Tx and Rx. Among between different sub-arrays, the SWM is considered, resulting in different transceiver angles, and thus $a_{rp}^{k_r,k_t}$ and $a_{tp}^{k_r,k_t}$ are different.

2) According to the channel model, the received signal can be expressed as $Y=\overline{W}^H H_{HSPM}\overline{F}+N$, $\overline{w}$ is the received combining matrix comprising the analog combining and digital combining matrices, and $\overline{F}$ is a transmitted beamforming matrix comprising an analog beamforming matrix and a digital beamforming matrix, and N is a noise signal.

Step 2, using the first sub-array at Tx and Rx as the reference sub-arrays, and perform parameter estimation by using the DCNN, including the departure angles, the angles of arrival the propagation distance, and the path gain.

2.1 The DCNN estimates the departure angles $(\theta_{t,p}, \phi_{t,p})$, the angle of arrival $(\theta_{r,p}, \phi_{r,p})$, the propagation $D_p^{k_r,k_t}$, and the path gain $|\alpha_p^{11}|$ according to Re{Y}, Im{Y} and |Y|.

Figure 2:
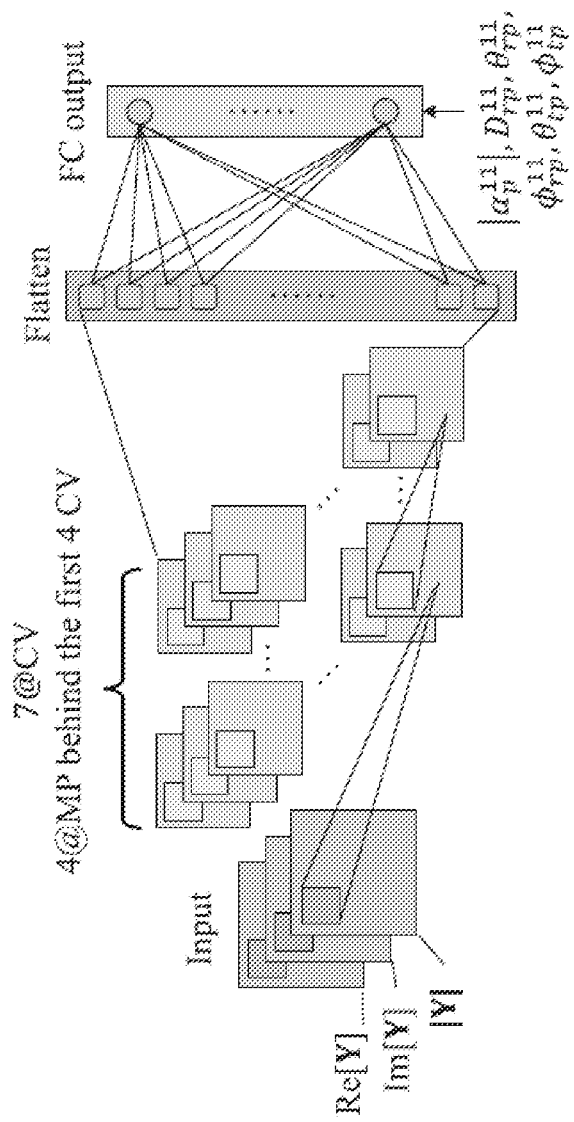
FIG. 2 is a structural diagram of the DCNN according to the present invention.
Figure 3A:
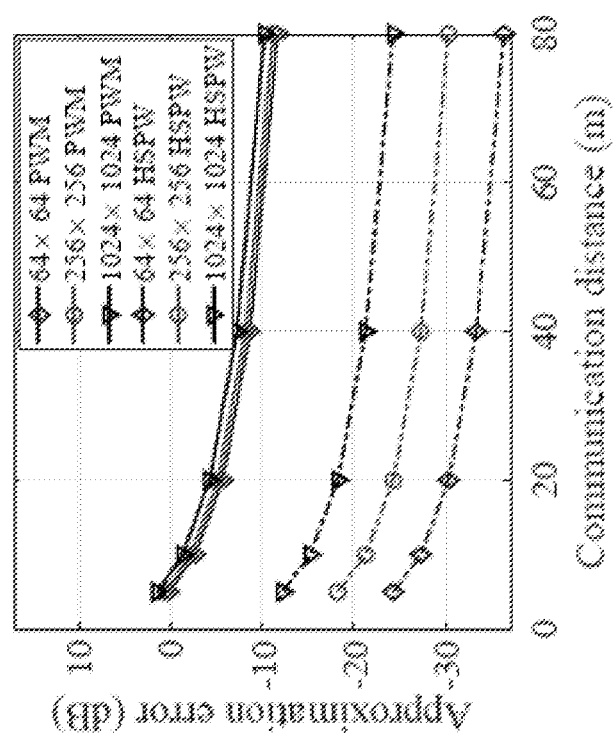
FIG. 3A is a schematic diagram of the effect of an embodiment: the error of different channel models at different communication distances is exploited.
Figure 3B:
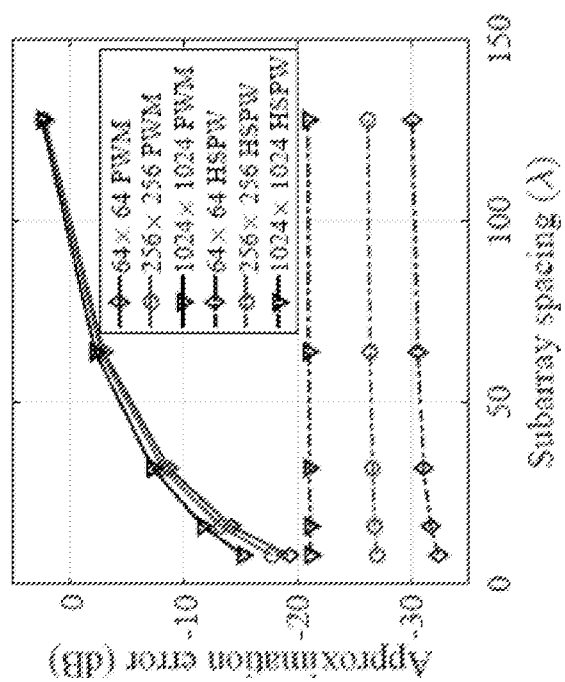
FIG. 3B is a schematic diagram of the effect of an embodiment: the error of different channel models at different sub-array spacing is determined
Figure 3C:
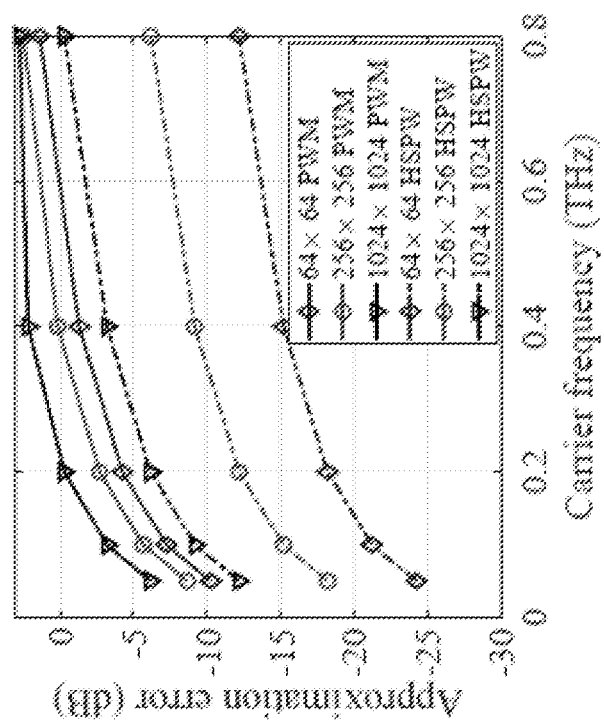
FIG. 3C is a schematic diagram of the effect of an embodiment: the error of different channel models at different carrier frequencies.
Figure 4:
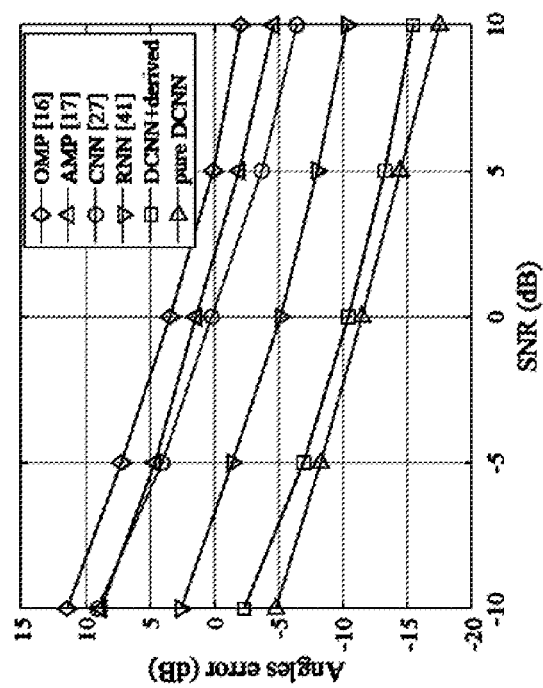
FIG. 4 is a schematic performance comparison diagram of the method of the present invention.

As shown in FIG. 2, there are totally 15 layers in the DCNN, which includes an input layer, seven convolutional layers (CV), four max-pooling layers (MP), a flattening layer, and a fully connected (FC) output layer, wherein the input layer receives the element real value Re{Y} of the channel observation matrix Y, the element imaginary value Im{Y} and the element absolute value |Y|; the CV respectively comprise 16, 32, 64, 128, 62, 32, 16 convolution kernels, wherein a convolution filter with a size of 3×3 is deployed to extract features; zero padding (ZP) and batch normalization (BN) are deployed in the convolution process; the pooling layer uses the maximum pooling method to extract the maximum value in the 2×2 size pool to reduce the number of network dimensions, and simplify the training process. The flattening layer rearranges the neurons into one dimension and is connected to the FC output layer for outputting the estimated emission angle, the angle of arrival, the propagation distance, and the path gain.

Step 3, deriving channel parameters between the reference sub-array and the remaining sub-arrays by using the geometric relationship between the sub-arrays obtained in Step 2, and restoring the channel matrix, specifically comprising:

1) Calculating parameters of the line-of-sight path: projecting the line-of-sight path as shown in FIG. 1 to the X-Y plane and the Y-Z plane, respectively, and deriving the $$\text{angles } \theta_t^{k_t k_r} = \arccos\left(\frac{D_{xy}^{11}\cos\theta_t^{11}}{D_{xy}^{k_t k_r}}\right), \theta_r^{k_t k_r} = \theta_r^{11} + \arcsin\left(\frac{\Delta d_x \cos\theta_t^{11}}{D_{xy}^{k_t k_r}}\right),$$

$$\phi_t^{k_t k_r} = \arccos\left(\frac{D_{yz}^{11}\cos\phi_t^{11}}{D_{yz}^{k_t k_r}}\right), \phi_r^{k_t k_r} = -\phi_r^{11} + \arcsin\left(\frac{\Delta d_z \cos\theta_t^{11}}{D_{yz}^{k_t k_r}}\right)$$

distance $$D^{k_t k_r} = \frac{D_{yz}^{k_t k_r}}{\cos\theta_t^{11}},$$

wherein: $\theta_t^{k_t k_r}$ and $\phi_t^{k_t k_r}$ denote the received azimuth and elevation angles of the $k_t$ sub-array at Tx end and the $k_r$ sub-array at Rx, respectively.

$$D_{xy}^{11} = D^{11}\cos\phi_t^{11} D_{yz}^{11} = D^{11}\cos\theta_t^{11},$$

$$D_{xy}^{k_t k_r} = \sqrt{(\Delta d_x^{k_t k_r})^2 + (D_{xy}^{11})^2 - 2\Delta d_x^{k_t k_r} D_{xy}^{11}\sin\theta_{t1}^{11}},$$

$$D_{yz}^{k_t k_r} = \sqrt{(\Delta d_z^{k_t k_r})^2 + (D_{yz}^{11})^2 - 2\Delta d_z^{k_t k_r} D_{yz}^{11}\sin\phi_r^{11}},$$

where $D^{11}$ represent the distance between the reference sub-arrays at Tx and Rx. $\Delta d_x^{k_t k_r}$ refer to the relative displacement of the $k_r$ sub-array at Rx to the $k_t$ sub-array at Tx along the X-axis. $\Delta d_z^{k_t k_r}$ is the relative displacement along the Z-axis of the $k_r$ sub-array at Rx to the $k_t$ sub-array at Tx.

$$D_{yz}^{11} = D^{11}\cos\theta_t^{11}, D_{xy}^{k_t k_r} = \sqrt{(\Delta d_x^{k_t k_r})^2 + (D_{xy}^{11})^2 - 2\Delta d_x^{k_t k_r} D_{xy}^{11}\sin\theta_{t1}^{11}}.$$

2) calculating the plane equation of the reflecting surface: solving the equation $A_p x + B_p y + C_p z + D_p = 0$ of the reflecting surface by means of the coordinates of the transceiver end and the equation of the equation.

$$A_p = \frac{\sin\phi_{tp}^{11}(C_p^{11}\cos\theta_{sp}^{11}\cos\phi_{sp}^{11} - B_p^{11}\sin\phi_{tp}^{11})}{\cos\phi_{sp}^{11}\sin\phi_{tp}^{11}(A_p^{11}\cos\theta_{sp}^{11} - B_p^{11}\sin\phi_p^{11})},$$

$$B_p = \frac{\sin\phi_{tp}^{11}(A_p^{11}\sin\phi_{sp}^{11} - C_p^{11}\sin\theta_{sp}^{11}\cos\phi_{sp}^{11})}{\cos\phi_{sp}^{11}\sin\phi_{tp}^{11}(A_p^{11}\cos\theta_{sp}^{11} - B_p^{11}\sin\theta_{sp}^{11})},$$

$C_p=1$, wherein the lower corner mark p indexes the propagation path, and the remaining parameter definitions are the same as the before.

3) obtaining parameters of the non-line-of-sight path after obtaining the plane equation of the reflecting surface, specifically comprising:

$$\theta_{tp}^{k_t k_r} = \arcsin\left[\frac{x_p^{k_r k_r}}{\sqrt{(x_p^{k_r k_r})^2 + (y_p^{k_r k_r})^2}}\right],$$

$$\phi_{tp}^{k_t k_r} = \arcsin\left[\frac{z_p^{k_r k_r}}{\sqrt{(x_p^{k_r k_r})^2 + (y_p^{k_r k_r})^2 + (z_p^{k_r k_r})^2}}\right],$$

$$\theta_{rp}^{k_t k_r} = \arcsin\left[\frac{x_p^{k_r k_r} - R_{k_r x}}{\sqrt{(x_p^{k_r k_r} - R_{1x})^2 + (y_p^{k_r k_r} - R_{1y})^2}}\right],$$

$$\phi_{rp}^{k_t k_r} = \arcsin\left[\frac{z_p^{k_r k_r} - R_{k_r z}}{\sqrt{(x_p^{k_r k_r} - R_{k_r x})^2 + (y_p^{k_r k_r} - R_{k_r y})^2 + (z_p^{k_r k_r} - R_{k_r z})^2}}\right].$$

where $$D_p^{k_t k_r} = \sqrt{(x_p^{k_r k_r})^2 + (y_p^{k_r k_r})^2 + (z_p^{k_r k_r})^2} +$$
$$\sqrt{(R_{k_r x} - x_p^{k_r k_r})^2 + (R_{k_r y} - y_p^{k_r k_r})^2 + (R_{k_r z} - z_p^{k_r k_r})^2}, x_p^{k_r k_r}, y_p^{k_r k_r}, z_p^{k_r k_r}$$

denotes the coordinates of the remaining subarrays od the reflection plane, $(R_{k_r x}, R_{k_r y}, R_{k_r z}) = (D^{11} \sin \theta_{t1}^{11} \cos \phi_{t1}^{11} + d_{rx}^{k_r}, D^{11} \cos \theta_{t1}^{11} \cos \phi_{t1}^{11}, D^{11} \sin \phi_{t1}^{11} - d_{rz}^{k_r})$.

In a specific practical experiment, we set 1024 antennas and 4 subarrays at Rx, the communication distance is 20 m and the carrier frequency is 0.3 THz, the precision of the HSPM combined channel model is improved by 14 dB. As shown in FIGS. 3A-C and FIG. 4 and Table 1, compared to the existing CE method, the CE method based on the DCNN can complete CE in 0.172 ms, and achieves an estimation precision of 5.2 dB.

TABLE 1

| Method | Computational Complexity | Running Time (ms) |
|---|---|---|
| OMP [16] | $\mathcal{O}((N_p N_t)^2)$ | 221 |
| AMP [17] | $\mathcal{O}((N_p N_t)^2)$ | 372 |
| CNN [27] | $\mathcal{O}(b(N_t N_r)^2)$ | 3.64 |
| RNN [40] | $\mathcal{O}(cC^3 K_t K_r)$ | 0.085 |
| DCNN | $\mathcal{O}(b(C^2 K_t K_r)^2)$ | 0.172 |

Compared with the prior art, the HSPM provided by the invention achieves high precision and low complexity of channel modeling, and compared with the PWM, the precision is improved by 14 dB, and compared with the SWM, the complexity is reduced by 99%. The proposed CE method based on the DCNN achieves the improvement of the CE precision of 5.2 dB, and at the same time, since only the channel parameters between the reference sub-arrays need to be estimated, the CE overhead of the method is reduced by 93%.

The above specific implementation may be locally adjusted by a person skilled in the art without departing from the principle and spirit of the present disclosure, and the protection scope of the present disclosure is subject to the claims and is not limited by the specific embodiments described above, and various implementations within the scope of the present disclosure are not limited by the present disclosure.

What is claimed is:

1. A Terahertz (THz) ultra-massive multi-input-output (UM-MIMO) channel estimation (CE) method based on a deep convolutional neural network (DCNN), comprising the following steps:
   step i), a hybrid spherical and planar-wave modeling (HSPM), which takes a sub-array as a unit, using a planar-wave channel model (PWM) in the sub-array, and models a channel among sub-arrays by a spherical-wave channel model (SWM);
   step ii), using a first sub-array at a transceiver end as a reference sub-array, using the DCNN to estimate a departure angle, an angle of arrival, a propagation distance and a path gain between reference sub-arrays according to real values, element imaginary values and element absolute values of channel observation matrix; and
   step iii), deriving channel parameters between the reference sub-array and remaining sub-arrays by using the channel parameters and geometric relationship between the sub-arrays, and reconstruct the channel observation matrix.

2. The method according to claim 1, wherein step i) comprises the following steps:
   a) dividing antennas at transmitter (Tx) and receiver (Rx) into $K_t$ and $K_r$ sub-arrays, respectively, and different sub-arrays have the same multi-path number $N_p$, the amplitude of the channel gain between different sub-arrays is the same, while the phase of the channel gain is changed due to different geometric distances and transceiver angles, to obtain a block structured channel model:

$$H_{HSPM} =$$

$$\sum_{p=1}^{N_p} \begin{bmatrix} |\alpha_p^{11}|e^{-j\frac{2\pi}{\lambda}D_p^{11}} a_{rp}^{11}(a_{tp}^{11})^H & \cdots & |\alpha_p^{11}|e^{-j\frac{2\pi}{\lambda}D_p^{1K_t}} a_{rp}^{1K_t}(a_{tp}^{1K_t})^H \\ \cdots & & \cdots \\ |\alpha_p^{11}|e^{-j\frac{2\pi}{\lambda}D_p^{K_r 1}} a_{rp}^{K_r 1}(a_{tp}^{K_r 1})^H & \cdots & |\alpha_p^{11}|e^{-j\frac{2\pi}{\lambda}D_p^{K_r K_t}} a_{rp}^{K_r K_t}(a_{tp}^{K_r K_t})^H \end{bmatrix},$$

wherein: $N_p$ is the number of multi-path in the channel, $\alpha_p^{11}$ is the channel gain of the p-th path, $\lambda$ is the signal wavelength, $D_p^{k_r k_t}$ is the transmission distance of the p-th path, $a_{rp}^{k_r k_t}$ and $a_{tp}^{k_r k_t}$ the antenna array guide vector for the transceiver end, respectively; and b) receiving a signal according to a channel model, wherein the received signal $Y = -H \overline{W}^H H_{HSPM} \overline{F} + N$, $\overline{W}$ is a received combining matrix comprising an analog combining matrix and a digital combining matrix, and $\overline{F}$ is a transmitting beamforming matrix comprising an analog beamforming matrix and a digital beamforming matrix, and N is a noise signal.

3. The method according to claim 2, wherein the block structured channel model refers to: each block $$|\alpha_p^{11}|e^{-j\frac{2\pi}{\lambda}D_p^{k_r k_t}} a_{rp}^{k_r k_t}(a_{tp}^{k_r k_t})^H$$

is a channel matrix between sub-arrays at the Tx and Rx, the channel matrix is a PWM matrix within a block, and among different sub-arrays, the channel is spherical-wave modeled, resulting in different transceiver angles, and thus the $a_{rp}^{k_r k_t}$ and $a_{tp}^{k_r k_t}$ for different $k_r$ and $k_t$ are different.

4. The method according to claim 1, wherein the DCNN comprises an input layer, seven convolutional layers (CV), four max-pooling layers (MP), a flattening layer, and a fully connected (FC) output layer, wherein the input layer receives the element real value Re{Y} of the channel observation matrix Y, the element imaginary value Im{Y} and the element absolute value |Y|; the CV respectively comprise 16, 32, 64, 128, 62, 32, 16 convolution kernels, wherein a convolution filter with a size of 3×3 is deployed to extract features; zero padding (ZP) and batch normalization (BN) are deployed in the convolution process; the pooling layer uses the maximum pooling method to extract the maximum value in the 2×2 size pool to reduce the number of network dimensions, and simplify the training process; the flattening layer rearranges neurons into one dimension and is connected to the FC output layer for outputting an estimated emission angle, the angle of arrival, the propagation distance, and the path gain.

5. The method according to claim 1, wherein the step iii) comprises:
a) calculating parameters of the line-of-sight path: respectively projecting the line-of-sight path to the X-Y plane and the Y-Z plane, and deriving a transceiver angle between the remaining sub-arrays under the line of sight $$\theta_t^{k_t k_r} = \arccos\left(\frac{D_{xy}^{11}\cos\theta_t^{11}}{D_{xy}^{k_t k_r}}\right), \theta_r^{k_t k_r} = \theta_r^{11} + \arcsin\left(\frac{\Delta d_x \cos\theta_t^{11}}{D_{xy}^{k_t k_r}}\right),$$

$$\phi_t^{k_t k_r} = \arccos\left(\frac{D_{yz}^{11}\cos\phi_t^{11}}{D_{yz}^{k_t k_r}}\right), \phi_r^{k_t k_r} = -\phi_r^{11} + \arcsin\left(\frac{\Delta d_z \cos\theta_t^{11}}{D_{yz}^{k_t k_r}}\right)$$

and the propagation distance $$D^{k_t k_r} = \frac{D_{yz}^{k_t k_r}}{\cos\theta_t^{11}},$$

wherein: $\theta_t^{k_t k_r}$ and $\phi_t^{k_t k_r}$ are the receiving azimuth angle and the elevation angle of the $k_t$ sub-array at the $k_t$ transmitting end, while $\theta_r^{k_t k_r}$ and $\phi_r^{k_t k_r}$ the $k_r$ sub-array at the $k_t$ receiving end, respectively, $$D_{xy}^{11} = D^{11}\cos\phi_t^{11} D_{yz}^{11} = D^{11}\cos\theta_t^{11},$$

$$D_{xy}^{k_t k_r} = \sqrt{(\Delta d_x^{k_t k_r})^2 + (D_{xy}^{11})^2 - 2\Delta d_x^{k_t k_r} D_{xy}^{11}\sin\theta_{t1}^{11}},$$

$$D_{yz}^{k_t k_r} = \sqrt{(\Delta d_z^{k_t k_r})^2 + (D_{yz}^{11})^2 - 2\Delta d_z^{k_t k_r} D_{yz}^{11}\sin\phi_r^{11}},$$

wherein: $D^{11}$ is the distance between the transmitting end and the reference sub-array of the receiving end, and $\Delta d_x^{k_t k_r}$ the relative displacement along the X axis of the $k_t$ sub-array at the $k_t$ transmitting end, here $D^{11}$ represent the distance between the reference sub-arrays at Tx and Rx, $\Delta d_x^{k_t k_r}$ refer to the relative displacement of the $k_r$ sub-array at Rx to the $k_t$ sub-array at Tx along the X-axis, $\Delta d_z^{k_t k_r}$ is the relative displacement along the Z-axis of the $k_r$ sub-array at Rx to the $k_t$ sub-array at Tx; $D_{yz}^{11} = D^{11} \cos \theta_t^{11}$, $$D_{xy}^{k_t k_r} = \sqrt{(\Delta d_x^{k_t k_r})^2 + (D_{xy}^{11})^2 - 2\Delta d_x^{k_t k_r} D_{xy}^{11}\sin\theta_{t1}^{11}};$$

b) calculating the plane equation of the reflecting surface: solving the equation $A_p x + B_p y + C_p z + D_p = 0$, by means of the reflecting surfaces by means of the coordinates of the transceiver end and the law of reflection, wherein: each parameter is:

$$A_p = \frac{\sin\phi_{tp}^{11}(C_p^{11}\cos\theta_{sp}^{11}\cos\phi_{sp}^{11} - B_p^{11}\sin\phi_{tp}^{11})}{\cos\phi_{sp}^{11}\sin\phi_{tp}^{11}(A_p^{11}\cos\theta_{sp}^{11} - B_p^{11}\sin\phi_p^{11})},$$

$$B_p = \frac{\sin\phi_{tp}^{11}(A_p^{11}\sin\phi_{sp}^{11} - C_p^{11}\sin\theta_{sp}^{11}\cos\phi_{sp}^{11})}{\cos\phi_{sp}^{11}\sin\phi_{tp}^{11}(A_p^{11}\cos\theta_{sp}^{11} - B_p^{11}\sin\phi_{sp}^{11})}, C_p = 1,$$

the lower corner mark p index the propagation path; and
c) obtaining parameters of the non-line-of-sight path after obtaining the plane equation of the reflecting surface, $$\theta_{tp}^{k_t k_r} = \arcsin\left[\frac{x_p^{k_t k_r}}{\sqrt{(x_p^{k_t k_r})^2 + (y_p^{k_t k_r})^2}}\right],$$

$$\phi_{tp}^{k_t k_r} = \arcsin\left[\frac{z_p^{k_t k_r}}{\sqrt{(x_p^{k_t k_r})^2 + (y_p^{k_t k_r})^2 + (z_p^{k_t k_r})^2}}\right],$$

$$\theta_{rp}^{k_t k_r} = \arcsin\left[\frac{x_p^{k_t k_r} - R_{k_r x}}{\sqrt{(x_p^{k_t k_r} - R_{1x})^2 + (y_p^{k_t k_r} - R_{1y})^2}}\right],$$

$$\phi_{rp}^{k_t k_r} = \arcsin\left[\frac{z_p^{k_t k_r} - R_{k_r z}}{\sqrt{(x_p^{k_t k_r} - R_{k_r x})^2 + (y_p^{k_t k_r} - R_{k_r y})^2 + (z_p^{k_t k_r} - R_{k_r z})^2}}\right].$$

wherein $$D_p^{k_t k_r} = \sqrt{(x_p^{k_t k_r})^2 + (y_p^{k_t k_r})^2 + (z_p^{k_t k_r})^2} +$$
$$\sqrt{(R_{k_r x} - x_p^{k_t k_r})^2 + (R_{k_r y} - y_p^{k_t k_r})^2 + (R_{k_r z} - z_p^{k_t k_r})^2}, x_p^{k_t k_r}, y_p^{k_t k_r},$$

are the coordinates of the reflection point of the remaining sub-array on the reflecting surface $(R_{k_r x}, R_{k_r y}, R_{k_r z}) = (D^{11} \sin \theta_{t1}^{11} \cos \phi_{t1}^{11} + d_{rx}^{k_r}, D^{11} \cos \theta_{t1}^{11} \cos \phi_{t1}^{11}, D^{11} \sin \phi_{t1}^{11} - d_{rz}^{k_r})$, and $d_{rx}^{k_r}$ is the distance from $k_r$ th sub-array of the receiving end to the reference sub-array along the X-axis, $d_{rz}^{k_r}$ is the distance from the $k_r$ th sub-array of the receiving end to the reference sub-array along the Z-axis.

6. A Terahertz (THz) ultra-massive multi-input-output (UM-MIMO) channel estimation (CE) system realizing the THz UM-MIMO CE method according to claim 1 comprising: radio frequency (RF)-chains, an analog beamformer, an analog combiner, and a digital combiner, wherein the RF-chain of the transmitting end receives a baseband pilot signal to perform digital beamforming to obtain a radio frequency signal, and the analog beamformer performs analog beamforming according to a preset beam codebook signal and transmits an analog beamforming signal to the channel; and the analog combiner at receiver (Rx) end combines the received signals and then outputs the received signals to a digital beam forming unit; the digital beamformer performs beamforming processing according to a combined analog signal to obtain a digital baseband signal, and the baseband end processes the digital baseband signal to complete the CE.

* * * * *